United States Patent [19]

Mizokami

[11] Patent Number: 4,460,262
[45] Date of Patent: Jul. 17, 1984

[54] AUTOMATIC EXPOSURE CONTROL CIRCUIT FOR TTL AUTOMATIC ELECTRONIC FLASH

[75] Inventor: Kazunori Mizokami, Hachioji, Japan

[73] Assignee: Olympus Optical Co. Ltd., Tokyo, Japan

[21] Appl. No.: 442,910

[22] Filed: Nov. 19, 1982

[30] Foreign Application Priority Data

Mar. 25, 1982 [JP]  Japan ................................. 57-47954
Mar. 25, 1982 [JP]  Japan ................................. 57-47955

[51] Int. Cl.³ .......................... G03B 7/00; G03B 15/05
[52] U.S. Cl. ..................................... 354/414; 354/416; 354/480
[58] Field of Search .................... 354/23 R, 32, 33, 34, 354/59, 414, 416, 480

[56] References Cited

U.S. PATENT DOCUMENTS 3,726,197  4/1973  Hasegawa et al. .................... 354/34
4,065,777  12/1977  Maitani et al. ......................... 354/59
4,107,706  8/1978  Ueda et al. ............................ 354/59
4,359,275  11/1982  Hasegawa ............................. 354/59

FOREIGN PATENT DOCUMENTS 55-10569  1/1980  Japan.

Primary Examiner—Russell E. Adams
Attorney, Agent, or Firm—Louis Weinstein

[57] ABSTRACT

An automatic exposure control circuit for a TTL automatic electronic flash for use with a camera having an electronic flash controlling capability and capable of photometry of reflection from a film surface performs photometry of stationary light until a shutter is fully open and then controls an emission of flashlight when the shutter is fully open and subsequently controls again photometry of stationary light after termination of the flashlight so that a ratio of the stationary light to the flashlight in light quantity can be an appropriate value.

16 Claims, 4 Drawing Figures

AUTOMATIC EXPOSURE CONTROL CIRCUIT FOR TTL AUTOMATIC ELECTRONIC FLASH

BACKGROUND OF THE INVENTION

The present invention relates to an automatic exposure control circuit for a TTL (through-the-lens) automatic electronic flash, and more particularly, to an automatic exposure control circuit for use with a single lens reflex camera adapted for TTL photometry of reflection from a film surface for controlling an exposure when photographing with the TTL automatic electronic flash.

The art of photographing with a TTL automatic electronic flash is well known in which the TTL automatic electronic flash is mounted on a single lens reflex camera adapted for TTL photometry of reflection from a film surface and the emission of light from the TTL automatic electronic flash is controlled by an exposure control circuit in the camera. The photographing operation with the TTL automatic electronic flash is effected by emitting light from the electronic flash when a focal plane shutter is fully open so as to supplement any insufficient illumination provided by stationary light such as natural light. Therefore an integration circuit for the photometry integrates a photo-current developed by the stationary light before the shutter is fully open and then integrates a photocurrent developed by the flashlight after the shutter is fully open. When the integrated value reaches a predetermined exposure level, an emission terminate signal is delivered from the camera to the associated TTL automatic electronic flash.

On the other hand, in a conventional photographing operation with an automatic electronic flash, an electronic flash charged signal is delivered to a camera when the electronic flash charging is completed and thereby an exposure time period for a shutter can be fixed which is closely synchronized with the operation of the electronic flash.

To this end, in the case, for example, that a background to be photographed is far apart from an main object to be photographed with an electronic flash and flashlight thereof can not reach the background sufficiently so that the flashlight does not affect an exposure of the background and stationary light exists to some extent in the background, a large difference in an exposure grade may be caused between the main object portion being exposed merely by the flashlight and the background portion being exposed merely by the stationary light. In such case, the background portion becomes much darker than the main object portion so that no good picture in tones can be obtained with the aforesaid conventional photographing operation with a TTL automatic electronic flash.

To this end, a measure against the above case has been taken in which an exposure time period with stationary light is properly extended by manually setting it so as to be longer than an exposure time period in synchronized relationship wih the operation of an electronic flash in use. In this case, however, since the exposure time period is to be set entirely resorting to a photographer's feeling, it is difficult to properly control an exposure grade of a background to be photographed to a main object to be photographed.

SUMMARY OF THE INVENTION

In view of the foregoing, it is an object of the present invention to provide an automatic exposure circuit for a TTL automatic electronic flash in which even after an emission of the electronic flash has been controlled by integrating a photocurrent developed thereby, a photocurrent developed by stationary light is integrated and when the integrated value reaches a predetermined value, a shutter is closed so that an exposure value of a background being photographed to a main object being photographed may be properly and automatically controlled.

According to the invention, since even after an emission of an electronic flash has been controlled so as to be a proper exposure to a main object being photographed, an integration of voltages developed by stationary light before the emission of the electronic flash is continued and when the integrated value developed by the stationary light reaches a proper value, a shutter blind is closed to complete the exposure, the main object exposed by the flashlight and the background exposed by the stationary light are automatically controlled in a proper exposure ratio so that a photographing operation based on a good exposure control making the best use of characteristics in the combination of a TTL automatic electronic flash and a single lens reflex camera capable of a TTL photometry of reflection from a film surface can be effected.

DESCRIPTION OF PREFERRED EMBODIMENTS

Figure 1:
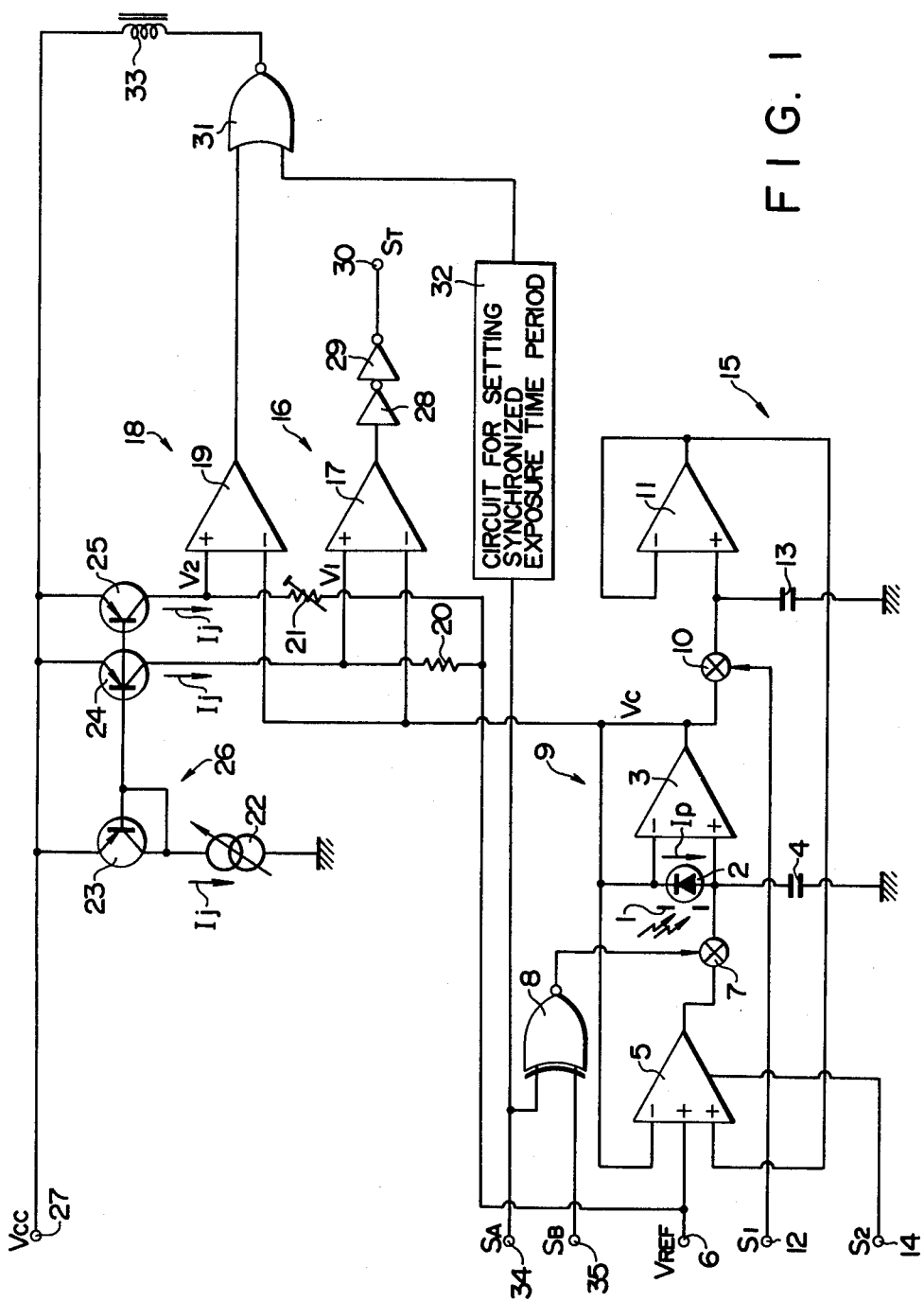
FIG. 1 is a circuit diagram of an automatic exposure control circuit for a TTL automatic electronic flash according to one embodiment of the invention.
Figure 2:
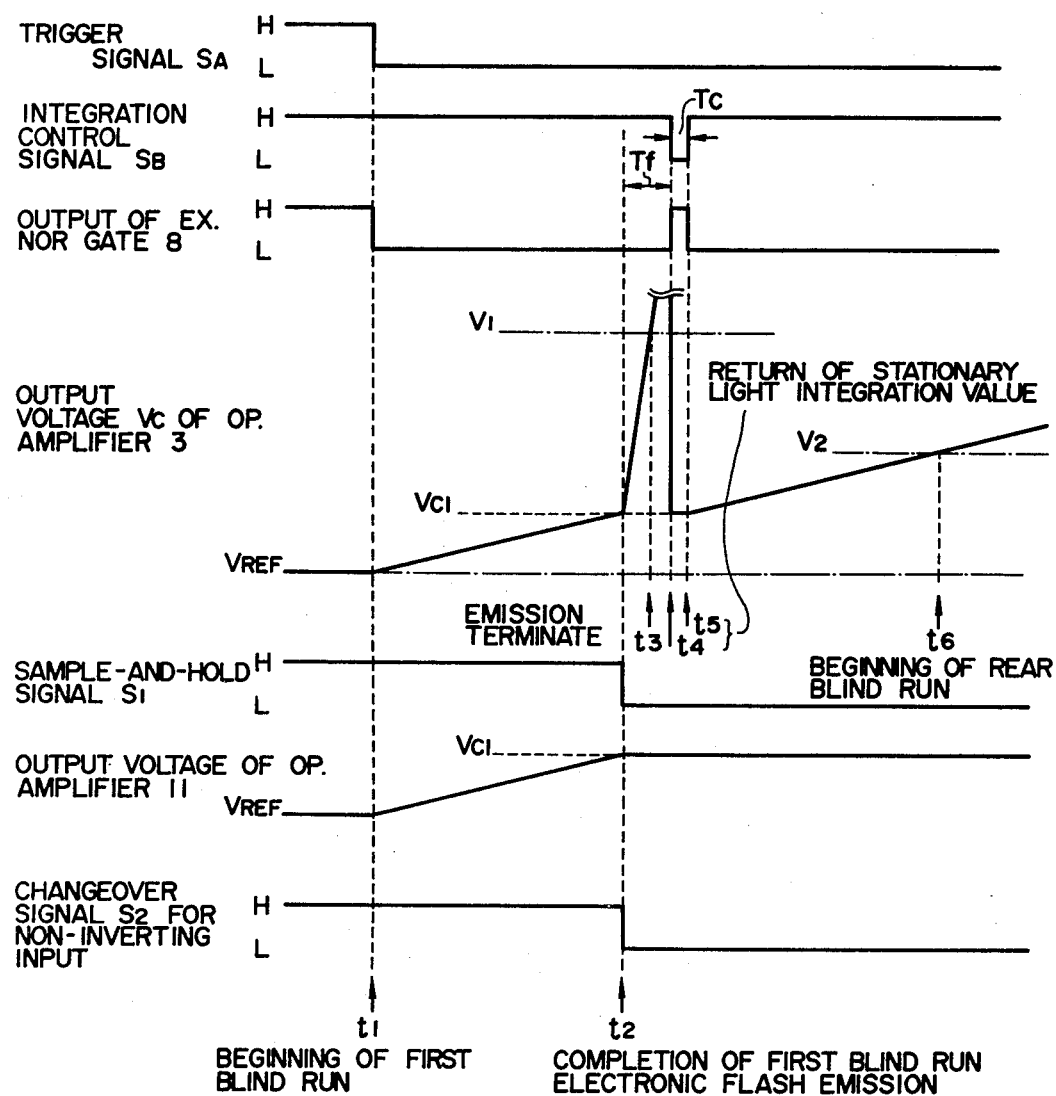
FIG. 2 is a time chart of signals in various sections for explaining behaviors of the automatic exposure control circuit of FIG. 1.

Referring to FIG. 1, there is shown an automatic exposure control circuit which is housed within a single lens reflex camera of the TTL photometry type which senses light reflection from a film surface. A photometric, photoelectric transducer element 2 receives light from an object being photographed through a lens diaphragm 1 of the camera which light is reflected by a first blind surface of a focal-plane shutter and a film surface exposed by running of the first blind. The transducer element 2 has its anode connected to a non-inverting input terminal and its cathode connected to an inverting input terminal of an operational amplifier 3. A capacitor 4 which acts as an integrator is connected between the non-inverting input terminal of the amplifier 3 and the ground. The output terminal of the amplifier 3 is connected to the inverting input terminal thereof and to the inverting terminal of an operational amplifier 5 in a previous stage of amplifier 3, respectively. The amplifier 5 has three input terminals, the first non-inverting input terminal of which is connected to a terminal 6 to which a reference voltage $V_{REF}$ is applied. The output terminal of the amplifier 5 is connected to the non-inverting input terminal of the amplifier 3 through a first analog switch 7. When the switch 7 is on, a feedback loop is formed by the amplifiers 3 and 5. The control terminal of the switch 7 is connected to an output terminal of an exclusive-NOR gate 8. One of the input terminals of the exclusive-NOR gate 8 is connected to a terminal 34 to which a trigger signal $S_A$ is applied which changes from its "H" (high) level to its "L" (low) level when a first blind of a shutter starts to run and the other of the input terminals is connected to a terminal 35 to which an integration control signal $S_B$ is applied which is normally in its "H" (high) level but changes to its "L" (low) level only for a predetermined short time period when a full emitting time period of an electronic flash expires after the first blind is fully open, as shown in FIG. 2.

An integration circuit 9 is formed by the transducer element 2, the capacitor 4 and the amplifier 3. The output terminal of the amplifier 3 is connected through a second analog switch 10 to a non-inverting input terminal of an operational amplifier 11. The switch 10 has its control terminal connected to a terminal 12 to which a sample-and-hold signal $S_1$ is applied. The signal $S_1$ changes from its "H" level to its "L" when the shutter blind is fully open. A capacitor 13 for storage is connected between the non-inverting input terminal of the amplifier 11 and the ground. The inverting input terminal of the amplifier 11 is connected to its output terminal which is connected to the second non-inverting input terminal of the amplifier 5. Connection for the first and the second non-inverting input terminal of the amplifier 5 are switchable depending upon a level of a changeover signal $S_2$ for the non-inverting inputs which is applied to a terminal 14 connected to the amplifier 5. An integrated value return circuit 15 is formed by a circuit including the second switch 10, capacitor 13, amplifier 11, amplifier 5 and first switch 7 which are disposed between the output and the input side of the integration circuit 9.

The output terminal of the amplifier 3 in the integration circuit 9 is connected to an inverting input terminal of an operational amplifier 17 which forms a comparator in a first decision circuit 16 and an inverting input terminal of an operational amplifier 19 which forms a comparator in a second decision circuit 18, respectively. The non-inverting input terminal of the amplifier 17 is connected through a resistor 20 for setting a first decision voltage thereto to the reference voltage terminal 6. The non-inverting input terminal of the amplifier 19 is connected through a semifixed resistor 21 for setting a second decision voltage thereof to the reference voltage terminal 6. The non-inverting input terminals of the amplifiers 17 and 19 are connected to collectors of transistors 24 and 25, respectively, in a constant-current circuit 26 including a variable constant-current source 22 and PNP transistors 23, 24 and 25. The emitter of the transistor 23 is connected to a terminal 27 to which a power supply voltage Vcc is applied and its collector is connected to its base as well as to the ground through the constant-current source 22. The transistors 24 and 25 have their bases connected in common to the base of the transistor 23 and their emitters connected in common to the emitter of the transistor 23. Accordingly, the circuit 26 forms a constant-current source for the current-mirror circuits.

The output terminal of the amplifier 17 in the first decision circuit 16 is connected through inverters 28 and 29 to a signal transmission terminal 30 for delivering an emission terminate signal $S_T$ to the TTL automatic electronic flash. The output terminal of the amplifier 19 in the second decision circuit 18 is connected to one of the input terminals of a NOR gate 31. The other one of the input terminals of the NOR gate 31 is connected to an output terminal of a circuit 32 for setting the exposure time period synchronized with the operation of the electronic flash and the output terminal of the NOR gate 31 is connected to the power supply terminal 27 through an electromagnetic coil 33 for restraining a second shutter blind. The input terminal of the synchronized exposure period setting circuit 32 is connected to the terminal 34 to which the trigger signal $S_A$ is applied. The circuit 32 provides a delay of time corresponding to the exposure period synchronized with the electronic flash for its changeover from "H" level to "L" level even when the trigger signal $S_A$ changes from its "H" level to its "L" level by the beginning of the first shutter blind running.

The operation of the automatic exposure control circuit will be described in the following with a time chart shown in FIG. 2. When the TTL automatic electronic flash is mounted on the camera and both of their power switches of are turned on, the supply voltage Vcc is applied to the terminal 27 and the reference voltage $V_{REF}$ is applied to the terminal 6. At that time, both the changeover signal $S_2$ and the integration control signal $S_B$ change to the "H" level. When the supply voltage Vcc is applied to the terminal 27, a current $I_j$ corresponding to a film speed preset by the constant-current source 22 flows into the collector of transistor 23, causing the same current $I_j$ to flow in each of the collectors of transistors 24 and 25 by the current-mirror effect. Since the resistance $R_1$ of the resistor 21 in the second decision circuit 18 is chosen in such a manner as to be one n-th to the resistance R of the resistor 20 in the first decision circuit 16, that is $R_1 = R/n$, the first decision voltage $V_1 = V_{REF} + I_j R$ is applied to the non-inverting input terminal of the amplifier 17 and the second decision voltage $V_2 = V_{REF} + I_j R/n$ is applied to the non-inverting input terminal of the amplifier 19. In this case, it is assumed that $n = 2^k$, where k represents the number of steps in a difference between exposure values by flashlight and stationary light. Then, the sample-and-hold signal $S_1$ at the terminal 12 and the trigger signal $S_A$ at the terminal 34 change to the "H" level by a shutter charging, in turn, turning the second switch 10 on and changing the output of the exclusive-NOR gate 8 to its "H" level to turn the first analog switch 7 on. Since the amplifier 5 is under a condition that the first non-inverting input terminal 6 is connected by the change of the changeover signal $S_2$ to its "H" level, the reference voltage $V_{REF}$ is applied from the output terminal of the amplifier 5 through the first switch 7 to the non-inverting input terminal of the amplifier 3 in the integration circuit 9. Consequently, the capacitor 4 is charged to a level of the reference voltage $V_{REF}$ and the output voltage Vc of the amplifier 3 is equal to the reference voltage $V_{REF}$. The output voltage Vc of the amplifier 3 is applied through the second switch 10 to the non-inverting input terminal of the amplifier 11 and the capacitor 13 is also charged to a level of the reference voltage $V_{REF}$. Thus the output voltage of the amplifier 11 is equal to the reference voltage $V_{REF}$.

Then, by depression of a shutter release button the movable reflecting mirror is driven upward and thereby the lens diaphragm 1 is stopped down. At the time $t_1$ when the upward motion of the movable mirror is completed, the first blind of a shutter starts to run. By the upward motion of the mirror the optical path for photographing is opened and stationary light from an object being photographed which is reflected by the first shutter blind through the lens diaphragm 1 impinges upon the transducer element 2. As a result, a photocurrent Ip corresponding to brightness of the object flows from the cathode of the transducer element 2 to its anode. At the time $t_1$ when the first blind starts to run, the trigger signal $S_A$ at the terminal 34 changes to its "L" level and thereby the output of the exclusive-NOR gate 8 changes to its "L" level causing the switch 7 to turn off. Thereupon, the photocurrent Ip flows into the capacitor 4 to initiate photometry by integration. Therefore the output voltage Vc of the amplifier 3 rises gradually from the time $t_1$ as an integration voltage of the photocurrent Ip developed by stationary light reflected by the first blind surface and a film surface exposed by the running of the first blind. Assuming that the capacitance of the capacitor 4 is C, the output voltage Vc of the amplifier 3 is given as $$Vc = V_{REF} + \frac{Ip}{C} t.$$

By gradually raising the voltage Vc, the voltage across the capacitor 13, as the switch 10 is on, is equal to the voltage Vc and thus the output voltage of the amplifier 11 rises as the output voltage Vc of the amplifier 3 does.

In addition, the output voltage Vc of the amplifier 3 is applied to the inverting input terminals of the amplifier 17 in the first decision circuit 16 and the amplifier 19 in the second decision circuit 18 and therefore voltages at the inverting input terminals of the amplifiers 17 and 19 rise as the first blind runs. Outputs of the amplifiers 17 and 19 are at their "H" level while the output voltage Vc of the amplifier 3 is lower than the first decision voltage $V_1$ and the second decision voltage $V_2$. At that time, the signal transmission terminal 30 is at its "H" level and remains in this state not delivering the emission terminate signal $S_T$. An output of the NOR gate 31 is also at its "L" level and the magnet coil 33 is in excited condition, thus the second blind is restrained from moving.

At the time $t_2$ when the running of the first blind is completed and the shutter blind is fully open, an emission signal is delivered to the electronic flash by the close of a synchronizing contact (not shown) to emit the flashlight. When the flashlight is applied to a main object being photographed, light reflected by the object impinges upon the transducer element 2. The resulting photocurrent Ip increases rapidly and then the output voltage Vc of the amplifier 3 also increases steeply from the time $t_2$. That is, the integration operation of the stationary light which operation is being performed from the time $t_1$ when the first blind begins to run is switched to an integration of the flashlight at the time $t_2$ when the shutter blind is fully open.

Additionally, at the time $t_2$ the sample-and-hold signal $S_1$ at the terminal 12 and the changeover signal $S_2$ at the terminal 14 change from their "H" level to their "L" level. Then the second switch 10 turns off and hence the output voltage $Vc_1$ of the amplifier 3 at the time $t_2$ is held in the capacitor 13. The voltage $Vc_1$ held in the capacitor 13 is taken as the output voltage of the amplifier 11 to be applied to the second non-inverting input terminal of the amplifier 5. The amplifier 5 is switched from a connected condition of the first non-inverting input terminal thereof to another connected condition of the second non-inverting input terminal thereof when the changeover signal $S_2$ changes to its "L" level so that the same voltage $Vc_2$ at the output terminal of the amplifier 11 appears at the output terminal of the amplifier 5 at the time $t_2$. However, as the first switch 7 remains off by the output at its "L" level of the exclusive-NOR gate 8, neither the output of the amplifier 5 nor the output of the integration value return circuit 15 is introduced into the input of the integration circuit 9.

When an amount of the flashlight reaches a proper value to the main object being photographed in progress of integrating the photocurrent based on the flashlight, the output voltage Vc of the amplifier 3 reaches the first decision voltage $V_1$. Then, at the time $t=t_3$ when the relation $$\frac{Ip}{C} t = I_j R$$

is satisfied the output of the amplifier 17 turns to its "L" level. At that time, the emission terminate signal $S_T$ at its "L" level is delivered from the signal transmission terminal 30 to the electronic flash to thereby interrupt its emission. At the time $t_4$ when a full emission time period $T_f$ has elapsed from the time $t_2$ after the emission is interrupted, the integration control signal $S_B$ at the terminal 35 turns to its "L" level. Then two inputs to the exclusive-NOR gate 8 become identical in level and its output changes to its "H" level to turn the first switch 7 on. Accordingly, the output voltage of the amplifier 5 is applied to the non-inverting input terminal of the amplifier 3 and the capacitor 4 is discharged through the amplifier 5 until the voltage across the capacitor 4 becomes equal to the output voltage of the amplifier 5. Thereby, the output voltage Vc of the amplifier 3 is identical with the output voltage of the amplifier 5 or the amplifier 11. In other words, since the output voltage of the amplifier 11 after the time $t_2$ is kept at the output voltage $Vc_1$ of the amplifier 3 which voltage level is present immediately before the electronic flash is emitted, the output voltage Vc again returns immediately to the output voltage $Vc_1$ which is level is present before the electronic flash is emitted. At the time $t_5$ when the integration control signal $S_B$ turns to its "H" level again after a given extremely short time period Tc, the output of the exclusive-NOR gate 8 turns to its "L" level to turn the switch 7 off. Then, starting from the time $t_5$ the capacitor 4 is charged again by a photocurrent Ip which is resulted from receiving of the stationary light with the transducer element 2 to raise the output voltage Vc of the amplifier 3 more and more from the voltage $Vc_1$.

As described in the foregoing, even after the photocurrent produced by the flashlight has been integrated after the shutter blind was fully open so that a proper amount of the exposed light is applied to the main object being photographed, the photocurrent produced by the stationary light is integrated so that an exposure of even a background being photographed with the stationary light can be effected which is remote from a main object being photographed and to which sufficient flashlight may not be applied.

As the photocurrent developed by the stationary light is integrated and thus the output voltage Vc of the amplifier 3 rises so that a proper amount of light exposed to the background with stationary light is obtained, the output voltage Vc of the amplifier 3 reaches the second decision voltage $V_2$. Then, at the time $t=t_6$ when the relation $$\frac{I_p}{C} t = I_j \cdot R/n$$

is satisfied the output of the amplifier 19 turns to its "L" level to deliver a start signal for the second blind running. Additionally, after the time $t_2$ when the electronic flash is emitted, the output of the synchronized exposure period setting circuit 32 remains in its "L" level and therefore the output of the NOR gate 31 turns to its "H" level at the time $t_6$ when the output of the amplifier 19 turns to its "L" level. As a result, the electromagnetic coil 33 is deenergized to make the second blind run and thus an exposure with the stationary light is completed.

Since the second decision voltage $V_2$ for deciding an exposure with the stationary light is one n-th to the first decision voltage $V_1$ for deciding an exposure with the flashlight, the number of steps in a difference between exposure values of the main object being photographed substantially with the flashlight and the background being photographed substantially with the stationary light is kEV as the relation $n=2^k$ is assumed. By way of example, in order to preset the difference of an exposure value for the background to the one for the main object to $-1EV$, $n=2$ is assumed in the relation $R_1=R/n$ for the resistance of the semifixed resistor 21. Further in order for the exposure difference to be preset as $-2EV$, it may be resulted in $n=4$. Thereby, exposures by the flashlight and the stationary light can be provided, the exposure difference therebetween being preset in each case.

In a further case that stationary light is comparatively sufficient in a photographing with a TTL automatic electronic flash, there is a possibility that the output voltage Vc of the amplifier 3 reaches the second decision voltage $V_2$ before the time $t_2$ when the shutter blind is fully open. At that time, even though the output of the amplifier 19 turns to its "L" level, there is no case that the second shutter blind starts to run before the electronic flash is emitted since the output of the synchronized exposure period setting circuit 32 is in its "H" level before the time $t_2$.

The automatic exposure control circuit for the TTL automatic electronic flash as described in the foregoing embodiment is so constructed that both integrations of stationary light and flashlight are performed by the single integration circuit 9. However, it may be so constructed that the integrations of stationary light and flashlight are performed by two respective independent integration circuits. An automatic exposure control circuit in such case will be described in the following as another embodiment.

Figure 3:
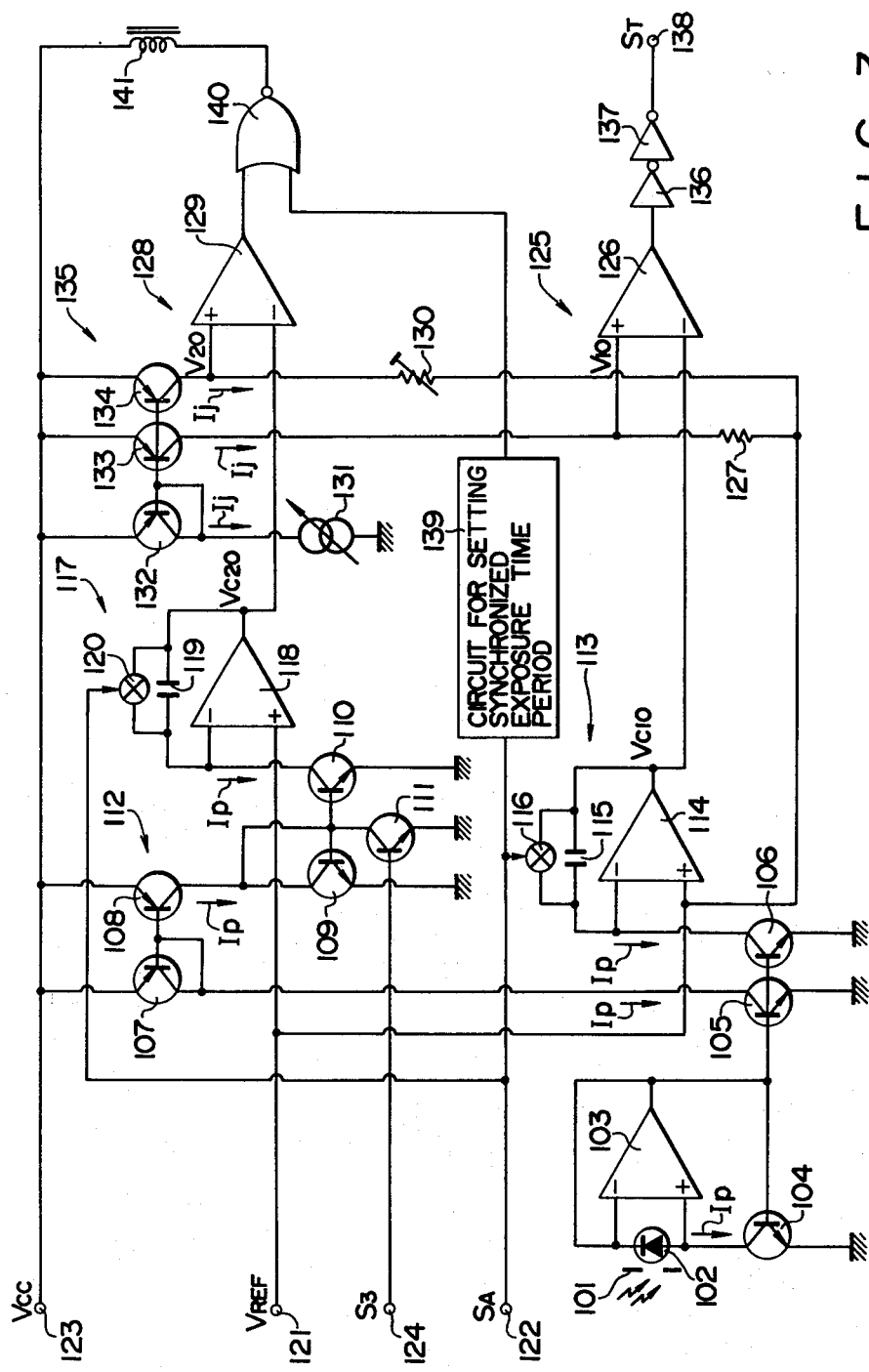
FIG. 3 is a circuit diagram of an automatic exposure control circuit according to another embodiment of the invention.

The automatic exposure control circuit illustrated in FIG. 3 is also housed within a single lens reflex camera adapted for TTL photometry of reflection from a film surface as in the aforesaid embodiment. A photometric, photoelectric transducer element 102 receives light from an object being photographed through a lens diaphragm 101 of the camera which light is reflected by a first blind surface of a focal plane shutter and a film surface exposed by the running of the first blind. The transducer element 102 has its anode connected to a non-inverting input terminal and its cathode connected to an inverting input terminal of an operational amplifier 103. The non-inverting input terminal of amplifier 103 is connected to the collector of an NPN transistor 104 and the output terminal of amplifier 103 is connected to the inverting input terminal thereof and the base of transistor 104. The juncture between the output terminal of amplifier 103 and the base of transistor 104 is connected to the bases of NPN transistors 105 and 106 which have the same characteristics as that of transistor 104. The emitters of transistors 105 and 106 are connected to the ground. The collector of transistor 105 is connected to the bases of transistors 107 and 108 in an integration control circuit 112 comprising PNP transistors 107 and 108 and NPN transistors 109, 110 and 111 which are disposed in a front stage of a second integration circuit 117. The collector of transistor 106 is connected to the inverting input terminal of an operational amplifier 114 in a first integration circuit 113. A capacitor 115 for integration is connected between the inverting input terminal and the output terminal of an operational amplifier 14. An analog switch 116 is connected in parallel across capacitor 115. The non-inverting input terminal of amplifier 114 is connected to a terminal 121 to which a reference voltage $V_{REF}$ is applied. The control terminal of an analog switch 116 is connected to a terminal 122 to which a trigger signal $S_A$ is applied which signal changes from its "H" level to its "L" level when a first blind starts to run.

The emitters of transistors 107 and 108 in the integration control circuit 112 are connected to a terminal 123 to which the power supply voltage Vcc is connected and the collector of transistor 108 is connected to the collectors of transistors 109 and 111 and the bases of transistors 109 and 110. The emitters of transistors 109, 110 and 111 are grounded. The base of transistor 111 is connected to a terminal 124 to which an integration pause signal $S_3$ at its "H" level is applied for a time period corresponding to the full emission time $T_f$ of the electronic flash after the completion of running of the first shutter blind. The collector of transistor 110 is connected to the inverting input terminal of amplifier 118 in the second integration circuit 117. A capacitor 119 for integration is connected between the inverting input terminal and the output terminal of amplifier 118 and an analog switch 120 is connected in parallel relation with the capacitor 119 therebetween. The non-inverting input terminal of the amplifier 118 is connected to the terminal 121 to which the reference voltage $V_{REF}$ is applied and the control terminal of analog switch 120 is connected to the terminal 122 to which the trigger signal $S_A$ is applied.

The output terminal of amplifier 114 in the first integration circuit 113 is connected to the inverting input terminal of an operational amplifier 126 which forms a comparator for a first decision circuit 125 and the output terminal of an operational amplifier 118 in a second integration circuit 117 is connected to the inverting input terminal of an operational amplifier 129 which forms a comparator for a second decision circuit 128. The non-inverting input terminal of amplifier 126 is connected to the terminal 121 for the reference voltage $V_{REF}$ through a resistor 127 for setting a first decision voltage $V_{10}$ and to the collector of transistor 133 in a film sensitivity presetting circuit 135 which includes a variable constant-current source 131 for presetting a film sensitivity and PNP transistors 132, 133 and 134. The non-inverting input terminal of amplifier 129 is connected to the terminal 121 for the reference voltage $V_{REF}$ through a semifixed resistor 130 for presetting a second decision voltage $V_{20}$ and to the collector of transistor 134 in the film sensitivity presetting circuit 135. The emitters of transistors 132 to 134 in the circuit 135 are connected to the terminal 123 for the power supply voltage Vcc and the bases of transistors 132 to 134, connected to one another in common, are connected to the collector of transistor 132. The constant-current source 131 is connected in common to the collector and the base of transistor 132.

The output terminal of amplifier 126 in the first decision circuit 125 is connected through inverters 136 and 137 to a signal transmission terminal 138 for delivering an emission terminate signal $S_T$ to the automatic electronic flash and the output terminal of amplifier 129 in the second decision circuit 128 is connected to one of the input terminals or a NOR gate 140. The other input terminal of the NOR gate 140 is connected to the output terminal of the synchronized exposure period setting circuit 139 and the output terminal of NOR gate 140 is connected to the terminal 123 for the power supply voltage through an electromagnetic coil 141 for restraining a second shutter blind. The input terminal of the circuit 139 is connected to the terminal 122 for the trigger signal $S_A$. Even though the trigger signal $S_A$ has been changed from its "H" level to its "L" level as a result of the initiation of running of the first shutter blind, the circuit 139 functions so that the time for changing to its "L" level is delayed by a time period corresponding to the exposure time period synchronized with the operation of the electronic flash.

Figure 4:
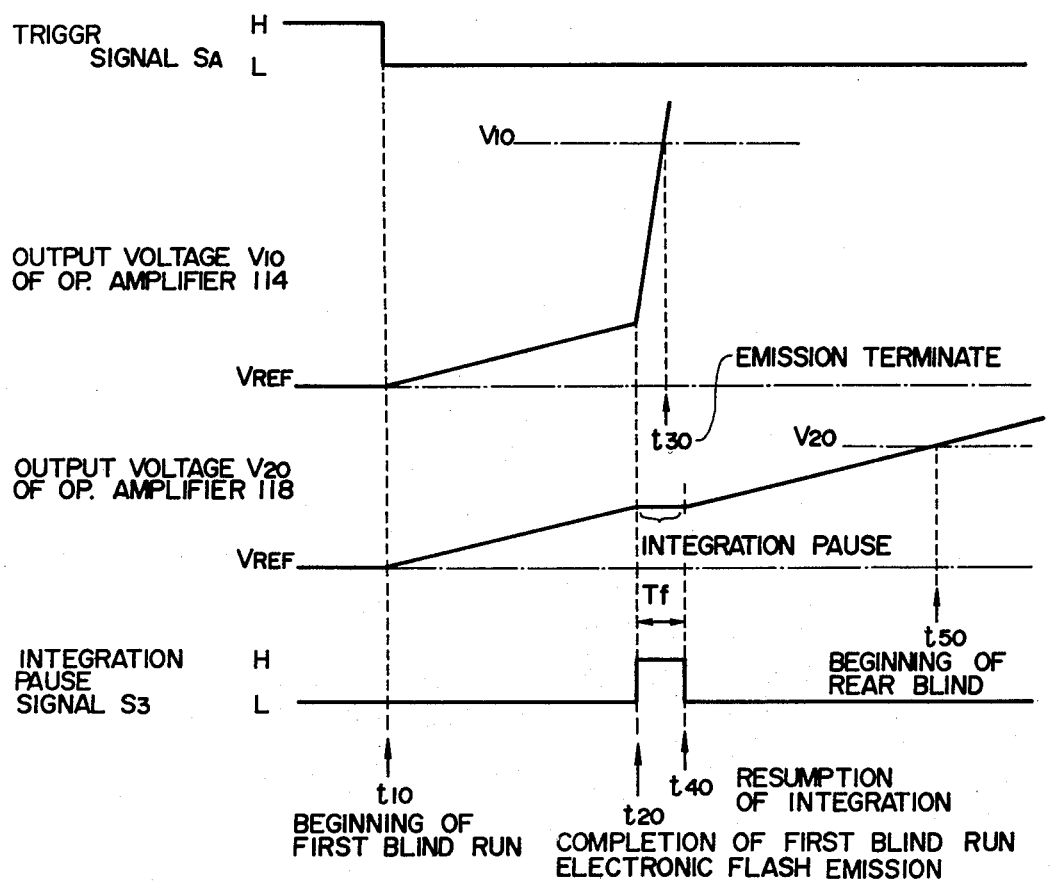
FIG. 4 is a time chart of signals in various sections for explaining behaviors of the automatic exposure control circuit of FIG. 3.

The operation of the automatic exposure control circuit of the aforesaid embodiment will be described referencing a time chart in FIG. 4. A TTL automatic electronic flash is mounted on a single lens reflex camera adapted for TTL photometry of light reflection from a film surface including the automatic exposure control circuit and then power supply switches associated with them are turned on, resulting in application of a power supply voltage Vcc at the terminal 123 as well as a reference voltage $V_{REF}$ at the terminal 121. Thereupon, a current $I_j$ corresponding to a film sensitivity preset by the variable constant-current source 131 flows in the collector of transistor 132 so that the same current $I_j$ may flow in the collectors of transistors 133 and 134 as a result of the current-mirror effect of transistors 132 to 134. As a consequence, assuming that the resistance of resistor 127 in the first decision circuit 125 be $R_0$, the first decision voltage $V_{10} = V_{REF} + I_j R_0$ is applied to the non-inverting input terminal of amplifier 126. In addition, the resistance of the semifixed resistor 130 in the second decision circuit 128 is assumed to be $R_0/n$ so that the second decision voltage $V_{20} = V_{REF} + I_j R_0/n$ is applied to the non-inverting input terminal of amplifier 129. Assuming $n = 2^k$, k represents the number of steps in a difference between exposure values determined by the first decision voltage $V_{10}$ and the second decision voltage $V_{20}$. That is, for the purpose of effecting an exposure control in such a manner that an exposure value of a background to be exposed with stationary light is reduced by kEV against an exposure value of a main object to be exposed with flashlight, as will be described later, the second decision voltage $V_{20}$ is preset to be one n-th of the first decision voltage $V_{10}$.

Under the circumstances, upon a shutter charging, the trigger signal $S_A$ at its "H" level is applied to the terminal 122 and in turn the analog switch 116 in the first integration circuit 113 and the analog switch 120 in the second integration circuit 117 turn on. Consequently, capacitors 115 and 119 are reset by short-circuitting between the inverting input terminals and the output terminals of amplifiers 114 and 118 and therefore both output voltages $V_{C10}$, $V_{C20}$ of amplifier 114 and 118 become equal to the reference voltage $V_{REF}$ which is applied to each of the non-inverting input terminals thereof.

Then, upon depression of a shutter release button, the movable reflecting mirror is raised and at the same time the lens diaphragm 101 is stopped down. Upon completion of the mirror rising, a first shutter blind starts to run. When the optical path for photographing is open as the mirror is driven upward, light from the object being photographed with the stationary light, which is reflected by the first shutter blind surface after passing through the lens diaphragm 101 which has been stopped down, impinges upon the transducer element 102, resulting in a photocurrent Ip corresponding to a brightness of the object which flows from the cathode to the anode of the transducer element 102. As the photocurrent Ip flows also as a collector current of transistor 104, the same Ip flows through the collectors of transistors 105 and 106 based on the current-mirror effect. The current Ip which flows in the collector of transistor 105 also flows through the collector of transistor 107 and further flows through the collector of transistor 108 based on the current-mirror effect.

Under the foregoing conditions, the integration pause signal $S_3$ at its "H" level is not yet applied to the terminal 124, being at its "L" level and therefore the transistor 111 is in an off condition. The bases of transistors 109 and 110 are at the "H" level so that they are in the on condition. As a result, the current Ip which flows through the collector of transistor 108 flows also through the collector of transistor 109 and the collector of transistor 110 based on the current-mirror effect. After all, the photocurrent Ip which is developed by impinging of light from the object being photographed upon the transducer element 102 is conducted by transistors 106 and 110 from the output terminals of amplifiers 114 and 118 though analog switches 116 and 120, respectively, to the ground. When the first shutter blind starts to run at the time $t_{10}$, the trigger signal $S_A$ at terminal 122 turns to its "L" level and thereby analog switches 116 and 120 turn off. At that time, the current Ip is conducted through capacitors 115 and 119, respectively, resulting in the initiation of photometry by integrating the photocurrent Ip in the first and the second integration circuit 113 and 117. As a result, the output voltage $V_{C10}$ of amplifier 114 and the output voltage $V_{C20}$ of amplifier 118 are gradually raised starting from the time $t_{10}$ as integrated voltages of the photocurrent corresponding to a quantity of stationary light reflected from the first shutter blind surface and a film surface exposed as the first shutter blind runs. Assuming that the capacitances of capacitor 115, 119 are C, the output voltages $V_{C10}$ of amplifier 114 and $V_{C20}$ of amplifier 118 are expressed as $$V_{C10} = V_{C20} = V_{REF} + \frac{Ip}{C} t.$$

The output voltage $V_{C10}$ from amplifier 114 is applied to the inverting input terminal of amplifier 126 in the first decision circuit 125 and the output voltage $V_{C20}$ from amplifier 118 is applied to the inverting input terminal of amplifier 129 in the second decision circuit 128. As long as the output voltages $V_{C10}$ and $V_{C20}$ which increase with the same rate as the first shutter blind runs are lower than the first decision voltage $V_{10}$, the output of amplifier 126 is at its "H" level to be in a condition not delivering the emission terminate signal $S_T$ to the electronic flash. Further, the output of amplifier 129 is also at its "H" level and the output of NOR gate 140 is at its "L" level and therefore the electromagnetic coil 141 is in an energized state so that the second shutter blind is maintained in a charged condition.

At the time $t_{20}$ when the shutter blind is fully open by the completion of running of the first shutter blind, an emission signal is delivered to the electronic flash by closing the synchronizing contact to permit the TTL automatic electronic flash to emit. When the flashlight is applied to a main object being photographed, the reflected light therefrom impinges upon the transducer element 102 to cause a rapid increase of the photocurrent Ip. Therefore, the output voltage $V_{C10}$ is raised with a steep slope starting from the time $t_{20}$.

On the other hand, at the $t_{20}$ when the shutter blind is fully open, the integration pause signal $S_3$ at its "H" level is applied to the terminal 124 to turn transistor 111 on. Consequently, transistors 109, 110 turn off and the current Ip is interrupted at the time $t_{20}$ which is charging capacitor 119 in the second integration circuit 117 through transistor 110, resulting in interruption of the integrating operation of the second integration circuit 117. As a result, the output voltage $V_{C20}$ of amplifier 118 is maintained at a constant value at the time $t_{20}$ thereafter. That is, the first integration circuit 113 is switched at the time $t_{20}$ after an integration with stationary light has been effected from the time $t_{10}$ so that an integration with the flashlight can be effected, whereas the second integration circuit 117 effects an integration with the stationary light in the similar manner as the first integration circuit 113 starting from the time $t_{10}$ and then ceases further integration at the time $t_{20}$.

In the first integration circuit 113, when an amount of the flashlight reaches a proper one to the main object being photographed as a result of integration of photocurrent developed by the flashlight, the output voltage $V_{C10}$ becomes the first decision voltage $V_{10}$. Then, at the time $t=t_{30}$ when the relation $$\frac{Ip}{C} t = IjR_0$$

holds, the output of amplifier 126 changes to its "L" level and in turn the emission terminate signal $S_T$ at its "L" level is delivered from the signal transmission terminal 138 to the electronic flash to thereby interrupt the emission.

While the photocurrent developed by the flashlight is integrated in the first integration circuit 113, the second integration circuit 117 keeps suspension of its integration operation. The integration pause signal $S_3$ at the terminal 124 is applied at its "H" level only for a time period corresponding to the full emission period $T_f$ starting from the emission time $t_{20}$ of the electronic flash so that the second integration circuit 117 may continue pausing the integration from the time $t_{20}$ to the time $t_{40}$ after the lapse of the full emission period $T_f$. Upon interruption of the emission of the electronic flash the integration pause signal $S_3$ at the terminal 124 changes to its "L" level at the time t', resulting in an off condition of transistor 111 and on conditions of transistors 109, 110 in the integration control circuit 112. As a consequence, the current Ip flows through transistor 110 to further charge capacitor 119 to resume the integration operation of the second integration circuit 117. Since the emission of the electronic flash has already been interrupted at the time $t_{40}$, the photocurrent developed by the stationary light is integrated by resumption in an integration operation of the second integration circuit 117. Then, the output voltage $V_{C20}$ of amplifier 118 rises again with a gradual ascent substantially similar to that in the running of the first shutter blind after the time $t_{40}$. Thus, a photocurrent developed by flashlight which is emitted by the electronic flash is integrated after the shutter blind has been fully open and even after a proper exposure has been given a photocurrent developed by stationary light is integrated, so that an exposure with the stationary light can be provided to a background being photographed which is located far from a main object being photographed and is therefore beyond the reach of the sufficient flashlight. In other words, an integration for emission control of the electronic flash which determines an exposure of a main object to be photographed is achieved by the first integration circuit 113 and an integration for control of an exposure time period which determines an exposure of a background to be photographed is achieved by the second integration circuit 117.

When a proper exposure with stationary light is obtained to the background while the output voltage $V_{C20}$ of amplifier 118 rises with integration of the photocurrent developed by the stationary light, the output voltage $V_{C20}$ reaches the second decision voltage $V_{20}$. Then, at the time $t=t_{50}$ when the relation $$\frac{Ip}{C} t = Ij \cdot R_0/n$$

holds the output of amplifier 129 changes to its "L" level to deliver the signal for initiation of the running of the second shutter blind. In addition, after the time $t_{20}$ when the electronic flash initiates its emission, the output of the synchronized exposure time period setting circuit 139 is at its "L" level and hence the output of NOR gate 140 changes to its "H" level at the time $t_{30}$ when the output of amplifier 129 changes to its "L" level. As a result, the electromagnetic coil 141 is rendered non-excited to permit the second shutter blind to run and thus the exposure with the stationary light is completed.

Since the second decision voltage $V_{20}$ for making a decision to the exposure with the stationary light is preset to one n-th of the first decision voltage $V_{10}$ for making a decision to the exposure with the flashlight, in the exposure control utilizing the TTL automatic electronic flash as described in the foregoing, the number of steps in a difference between exposure values of the main object exposed mainly by the flashlight and the background exposed only by the stationary light is obtained as kEV from $n=2^k$. By way of example, in order for a difference between exposure values of the background and the main object to be preset as $-1$ EV, it may be resulted in $n=2$ for the resistance $R_0/n$ of the semifixed resistor 130. Further, in order for the exposure difference to be preset as $-2$ EV, it may be resulted in $n=4$. Thereby, exposures based on the flashlight and the stationary light can be provided with the exposure difference therebetween as preset in each case.

When stationary light is comparatively sufficient in a photographing with the TTL automatic electronic flash associated with the automatic exposure control circuit described in the foregoing, there may be the possibility that the output voltage $V_{C20}$ of amplifier 118 reaches the second decision voltage $V_{20}$ before the time $t_{20}$ when the shutter blind is fully open. At that time, even though the output of amplifier 129 changes to its "L" level, there is no case that the second shutter blind starts to run before the electronic flash is emitted because the output of the synchronized exposure time period setting circuit 139 is at its "H" level before the time $t_{20}$.

What is claimed is:

1. An automatic exposure control circuit for a TTL automatic electronic flash for use with a camera adapted for photometry based upon reflection from a film surface and having the capability to control the emission of light from the TTL automatic electronic flash, comprising:
    an integration circuit for integrating a photocurrent developed in a photometric, photoelectric transducer element which receives light reflected by a first shutter blind surface and a film surface exposed by running of said first blind surface;
    an integration value return circuit for returning the output of said integration circuit to an integrated value which is developed at the time when said first shutter blind terminates its running, after a predetermined time period has elapsed upon termination of the running thereof;
    a first decision circuit for delivering an emission terminate signal to said electronic flash whenever the output of said integration circuit reaches a first predetermined decision level;
    a second decision circuit for delivering a run initiation signal for a second shutter blind whenever the output of said integration circuit reaches a second predetermined decision level; and
    time period means for setting a synchronized exposure time period and gate means responsive to said time period setting means and said second decision circuit for preventing the generation of a run initiation signal for the second shutter at least until the time interval required for a full emission of the electronic flash is elapsed.

2. An automatic exposure control circuit according to claim 1 in which the integration value return circuit comprises:
    a storage capacitor for charging the output voltage of said integration circuit during the running of the first shutter blind;
    a first switch normally coupling the storage capacitor to the integration circuit adapted to be opened at a time when the first shutter blind terminates its running for permitting the output voltage of said integration circuit which is developed at said time to be held in said storage capacitor, and
    a second switch adapted to be rendered on at a time when a full emission time period for the electronic flash has elapsed after the first shutter blind had completed its running for permitting the output voltage of said integration circuit to be returned from an integrated voltage based on flashlight to a voltage held in said storage capacitor and immediately thereafter, by a turn-off action of said second switch, for permitting an integration operation based on stationary light with said integration circuit to be resumed from said returned voltage.

3. An automatic exposure control circuit according to claim 1 in which the second decision circuit has its output coupled with a logical circuit in which an exposure control output signal for permitting the second shutter blind to start running is produced by applying a logical operation to a run initiation signal for the second shutter blind which is produced from said second decision circuit and an output signal of a circuit for setting the exposure time period synchronized with the operation of the electronic flash which signal is produced when the synchronized exposure time period has elapsed.

4. An automatic exposure control circuit for a TTL automatic electronic flash for use with a camera adapted for photometry based upon reflection from a film surface and having the capability to control the emission of light from the TTL automatic electronic flash, comprising:
    a first integration circuit for integrating a photocurrent based on stationary light reflected by a first shutter blind surface and a film surface exposed by running thereof while the first shutter blind runs and for integrating a photocurrent based on light including flashlight reflected by the film surface after the completion of the first shutter blind running;
    a first decision circuit for delivering an emission terminate signal to the electronic flash when an output of said first integration circuit reaches a predetermined first decision level;
    a second integration circuit for integrating a photocurrent based on stationary light reflected by the first shutter blind surface and the film surface exposed by running thereof while the first shutter blind runs and for reintegrating a photocurrent based on stationary light reflected by the film surface after interruption of an integration operation of said first integration circuit at least for such integration period that a photocurrent based on the light reflected by the film surface including flashlight is integrated therein after the completion of the first shutter blind running; and
    a second decision circuit for delivering a run initiation signal for the second shutter blind when an output of said second integration circuit reaches a predetermined second decision level.

5. An automatic exposure control circuit according to claim 4 in which the second decision circuit has is provided its output coupled side with a logical circuit which delivers an exposure control output signal for permitting the second shutter blind to start running by applying a logical operation to a run initiation signal for the second shutter blind at the time delivered from said second decision circuit and an output signal of the synchronized exposure period setting circuit which signal is produced when the synchronized exposure time period has elapsed.

6. An automatic exposure control circuit for a TTL automatic electronic flash employed with a camera adapted for photometry based upon reflection from a film surface and having the capability of controlling the emission of light from the TTL automatic electronic flash, comprising:
    an integrating circuit for integrating a photocurrent developed in a photometric, photoelectric transducer element, which receives light reflected from a first shutter blind surface and a film surface exposed by the running of said first shutter blind surface;
    an integration value return circuit for storing the integration level developed by said integration circuit when said first shutter blind terminates its running;

means responsive to said integration value return circuit for returning said integration circuit to the level of said integration value return circuit a predetermined time period after said first shutter blind has terminated its running;

a first decision circuit for delivering an emission terminate signal to said electronic flash whenever the output of said integration circuit reaches a first predetermined decision level; and a second decision circuit for delivering a run initiation signal for a second shutter blind whenever the output of said integration circuit reaches a second predetermined decision level.

7. An automatic exposure control circuit for a TTL automatic electronic flash for use with a camera adapted for photometry based upon reflection of light from a film surface and capable of controlling light emission from the TTL automatic electronic flash comprising:

a transducer element responsive to light reflected from the surface of a first shutter blind and thereafter from a film surface exposed by running of said first shutter blind to generate a photocurrent whose magnitude is related to light intensity;

an integration circuit for integrating said photocurrent;

an integration level return circuit including storing means for storing the level achieved by the integration circuit upon termination of running of said first blind;

means for generating a flash initiate signal to cause emission of the electronic flash responsive to completion of running of said first shutter blind;

a first decision circuit for delivering an emission terminate signal to said electronic flash when the integration circuit reaches a first predetermined level;

means responsive to the termination of running of said first shutter blind for restoring said integration circuit to the level of said storing means; and a second decision circuit for delivering a run initiate signal for operating a second shutter blind when the output of said integration circuit reaches a second predetermined level.

8. The circuit of claim 7 wherein the predetermined values of said first and second decision circuits are set to the difference between the exposure value for the main object and the background.

9. The circuit of claim 7 further comprising delay means for preventing closure of said shutter prior to completion of a flash emission interval.

10. The circuit according to claim 7 further comprising:

amplifier means coupled between said storing means and said integration circuit and responsive to a control signal for setting the integration circuit to the level of said storing means.

11. An automatic exposure control circuit for a TTL automatic electronic flash for use with a camera adapted for photometry based upon reflection of light from a film surface and capable of controlling light emission from the TTL automatic electronic flash comprising:

a transducer element responsive to light reflected from the surface of a first shutter blind and thereafter from a film surface exposed by running of said first shutter blind to generate a photocurrent whose magnitude is related to light intensity;

first and second integration circuits for integrating the output of said transducer element;

means responsive to termination of running of said first blind for preventing charging of said second integration circuit during a predetermined interval sufficient to complete emission of said electronic flash;

a first decision circuit responsive to said first integration circuit for generating an emission terminate signal to terminate emission of said electronic flash when the output of said first integration circuit reaches a first predetermined level; and a second decision circuit responsive to said second integration circuit for generating a shutter closing signal to close the shutter when the output of said second integration circuit reaches a second predetermined level.

12. The circuit of claim 11 further comprising current mirror circuits for applying the photocurrent developed by said transducer element to said first and second integration circuits.

13. The circuit of claim 11 wherein said first and second integration circuits are each comprised of operational amplifiers having an integrating capacitor coupled between the output and one of the inputs of said operational amplifier.

14. The circuit of claim 13 further comprising switch means coupled across each integrating capacitor and responsive to charging of the camera shutter for discharging said integrating capacitors.

15. The circuit of claim 12 further comprising means responsive to opening of said camera shutter for deactivating the current mirror circuit coupled to said second integration circuit during the emission interval of the electronic flash.

16. A method of photographing an image using an electronic flash and a light sensitive transducer of TTL photometry system, said image comprising a main object and a background separated by a large distance comprising the steps of:

exposing the transducer to the image through the camera lens as the shutter is being opened;

providing an integrating capacitor for integrating the photocurrent of the transducer;

storing the integrated value developed at the time that the shutter is fully opened;

activating the electronic flash when the shutter is fully opened;

comparing the integrated value being developed during flash emission with a first predetermined level;

developing a flash terminate signal when the integrated value reaches said predetermined level;

setting the level of the integrating capacitor to the stored value after termination of flash emission and thereafter integrating the integrating capacitor with stationary light reflected from said background;

comparing the integrated value with a second predetermined level; and generating a shutter closing signal when the integrated value reaches said second predetermined level.

* * * * *

UNITED STATES PATENT AND TRADEMARK OFFICE
CERTIFICATE OF CORRECTION

PATENT NO. : 4,460,262

DATED : July 17, 1984

INVENTOR(S) : Kazunori Mizokami

It is certified that error appears in the above-identified patent and that said Letters Patent is hereby corrected as shown below:

Column 9, line 53, "2k, k" should read -- $2^k$, k --.

Column 11, line 63, "t'," should read -- $t_{40}$, --.

Signed and Sealed this

Fourth Day of June 1985

[SEAL]

Attest:

DONALD J. QUIGG

Attesting Officer     Acting Commissioner of Patents and Trademarks